United States Patent [19]

Berliner

[11] Patent Number: 5,787,466
[45] Date of Patent: Jul. 28, 1998

[54] MULTI-TIER CACHE AND METHOD FOR IMPLEMENTING SUCH A SYSTEM

[75] Inventor: Brian Berliner, Colorado Springs, Colo.

[73] Assignee: Sun Microsystems, Inc., Mountain View, Calif.

[21] Appl. No.: 641,653

[22] Filed: May 1, 1996

[51] Int. Cl.$^6$ .................................................. G06F 12/08
[52] U.S. Cl. ........................... 711/117; 711/113; 711/160
[58] Field of Search ................................... 395/440, 449, 395/460, 461, 463, 487, 486; 711/113, 122, 133, 134, 136, 159, 160, 117

[56] References Cited

U.S. PATENT DOCUMENTS

| | | | |
|---|---|---|---|
| 4,186,438 | 1/1980 | Benson et al. | 711/113 |
| 4,774,654 | 9/1988 | Pomerene et al. | 395/449 |
| 4,897,781 | 1/1990 | Chang et al. | 395/617 |
| 4,947,319 | 8/1990 | Bozman | 395/445 |
| 5,404,487 | 4/1995 | Murata et al. | 395/440 |
| 5,418,921 | 5/1995 | Cortney et al. | 395/441 |
| 5,434,992 | 7/1995 | Mattson | 395/446 |
| 5,581,726 | 12/1996 | Tanaka | 395/461 |
| 5,586,291 | 12/1996 | Lasker et al. | 711/113 |
| 5,588,129 | 12/1996 | Ballard | 395/440 |
| 5,608,890 | 3/1997 | Berger et al. | 395/440 |
| 5,636,359 | 6/1997 | Beardsley et al. | 395/449 |
| 5,694,571 | 12/1997 | Fuller | 711/113 |

FOREIGN PATENT DOCUMENTS 0 667 579 A  8/1995  European Pat. Off. .

OTHER PUBLICATIONS

Proceedings of the IEEE, vol. 80, No. 8, 1 Aug. 1992, pp. 1238–1260, Katz, R.H.: "High–Performance Network and Channel Based Storage".

Offene Systeme. Unix in Deutschland. Guug–Jahrestagung–Open Systems. Unix in Germany. Guug Annual Meeting. 1995, pp. 245–250, Back, S.: "Solstice Autoclient–Eine Systeminstallation Als Ersatzteil".

Computer, vol. 27, No. 3, 1 Mar. 1994, pp. 38–46, Karedla R. et al.: "Caching Strategies to Improve Disk System Performance".

Hennessy, J. et al. Computer Architecture: A Quantitative Approach, pp. 411–412, 1990.

Primary Examiner—Tod R. Swann
Assistant Examiner—Conley B. King, Jr.
Attorney, Agent, or Firm—William J. Kubida; Stuart T. Langley; Holland & Hart LLP

[57] ABSTRACT

A multi-tier cache system and a method for implementing the multi-tier cache system is disclosed. The multi-tier cache system has a small cache in random access memory (RAM) that is managed in a Least Recent Used (LRU) fashion. The RAM cache is a subset of a much larger non-volatile cache on rotating magnetic media (e.g., a hard disk drive). The non-volatile cache is, in turn a subset of a local CD-ROM or of a CD-ROM or mass storage device controlled by a server system. In a preferred embodiment of the invention, a heuristic technique is employed to establish a RAM cache of optimum size within the system memory. Also in a preferred embodiment, the RAM cache is made up of multiple identically-sized sub-blocks. A small amount of RAM is utilized to maintain a table which implements a Least Recently Used (LRU) RAM cache purging scheme. A hashing mechanism is employed to search for the "bucket" within the RAM cache in which the requested data may be located. If the requested data is in the RAM cache, the request is satisfied with that data. If the requested data is not in the RAM cache, the least recently used sub-block is purged from the cache if the cache is full, and the RAM cache is updated from the non-volatile cache whenever possible, and from the cached storage device when the non-volatile cache does not contain the requested data.

30 Claims, 3 Drawing Sheets

MULTI-TIER CACHE AND METHOD FOR IMPLEMENTING SUCH A SYSTEM

This application is related to U.S. application Ser. No. 8/640,670 filed on Apr. 1, 1996; to U.S. application Ser. No. 8/641,654 filed on May 1, 1996; to U.S. application Ser. No. 8/640,527 filed on May 1, 1996; to U.S. application Ser. No. 8/641,523 filed on May 1, 1996; and to U.S. application Ser. No. 8/639,531 filed on May 1, 1996, all assigned to Sun Microsystems, Inc. assignee of the present invention, the disclosures of which are herein incorporated by this reference.

BACKGROUND OF THE INVENTION

1. Field of the Invention

This invention relates to caching systems for data processing systems, and methods for implementing such systems.

2. Description of Related Art

Caching has long been employed to increase performance of a relatively slow computer memory resource when a faster memory resource, which typically has a higher cost per stored bit, is available. Typically, a temporary memory block within the faster memory resource (i.e., a cache) is established for storing only a portion of the information stored within the slower memory resource. Rather than store within the faster memory resource an entire application program or an entire data file that may be resident on the slower memory resource, certain algorithms are employed to determine which portions of the program or data file are most likely to be accessed. When the system's central processing unit (CPU) calls a memory location that is not stored in the cache, the cache (if completely filled) must be at least partially overwritten with the required data from the slower memory resource. Likewise, when permanent changes are made to data, data in both the cache and the slower memory resource must be updated to reflect that change.

As this is written, there are roughly 150 million computers throughout the world capable of performing general business-related tasks. When the rapid proliferation of personal computers began in the early 1980s, nearly all of them were employed as stand-alone units. However, multi-user systems were soon developed. These early multi-user systems ran software written for the CP/M disk operating system, which had been written by Gary Kildall and was marketed by his company, Digital Research, Inc. The multi-user disk operating system MP/M supplied by Digital Research, Inc. connected several "dumb" terminals to a single microprocessor and a shared disk drive, while TURBODOS—a much more sophisticated product supplied by an unrelated company—utilized a master/slave arrangement much like the Local Area Networks (LANs) in use today.

Both the MP/M and the TURBODOS disk operating systems ran on computer systems based on either the INTEL 8080 microprocessor or the ZILOG Z-80 microprocessor. Neither of these early microprocessors could directly address more than 65,536 bytes of random-access memory. As a consequence of MP/M and TURBODOS operating systems requiring a minimum of about 50,000 bytes of random access memory, only about 15,000 bytes of addressable memory remained for application programs. As few application programs, other than simple word processors, required 15,000 bytes or less, the early multi-user systems were, for the most part, more intellectual curiosities than they were practical, general-use, multi-user data processing systems.

Distributed data processing (i.e., multiple LANs interconnected via a long-distance data link) using either MP/M or TURBODOS operating systems was even more hopeless, as it would have required loading a communication program into memory, in addition to the operating system, before application software could be loaded. However, with the introduction of IBM-compatible computers based on the INTEL 80286 microprocessor, which was designed to address several megabytes of random-access memory, the development of practical LANs and distributed data processing systems became feasible. Although Novell Corporation initially captured a majority share of the LAN market, the number of networks utilizing LAN software from Microsoft Corp. has been growing.

Distributed data processing networks and the LANs within those distributed networks can often benefit from caching. Typically, data links between LANs of a distributed processing network are slower than the interconnections between the nodes (i.e., individual computers) of a LAN. Furthermore, though a distant memory resource (e.g. a disk drive on a distant server system) may be as fast or even faster than local memory resources, long distance interconnections over a data link can dramatically slow access time to that distant resource. Regardless of the type of link between the LANs of a distributed processing network, or between the nodes (i.e., individual systems) of a LAN, each data link has a given bandwidth which will permit only a finite amount of data to be simultaneously transferred over the link. Once the bandwidth is exceeded, as for example when more than a certain number of users are attempting to communicate over the same link (whether between LANs or within a LAN), response time over that link typically degrades as each user's request is delayed in order to evenly accommodate all competing requests. Consequently, caching of data read over a network can generally increase system performance both by reducing data link loading and by providing the end user with a cache of rapidly accessible data.

Within the last several years, compact disc read-only-memory devices (CD-ROMs) have become extremely popular due to the availability of low-cost, high-capacity compact disk storage media and relatively low cost CD-ROM readers (drives). In fact, nearly all new personal computers being sold in the U.S. include an installed CD-ROM drive. Although current CD-ROM media are capable of storing approximately 450–500 megabytes of data, access to that data is considerably slower than data stored on a modern hard disk drive. For example, the current standard for a high-performance CD-ROM drive, known as a "6X" drive is capable of reading, at most, about 600 kilobytes of data per second. A modern high-speed IDE hard disk drive, on the other hand, is capable of reading about six megabytes per second—roughly ten times the speed of a 6X CD-ROM drive. Thus, CD-ROM drive performance may also be greatly enhanced through caching.

Many graphical user interface (GUI) environments, such as MICROSOFT® WINDOWS™ version 3.X, MICROSOFT WINDOWS 95, WINDOWS NT®, IBM Corporation's OS/2®, and GEOWORKS® have been developed over the years. Of the aforementioned products, only WINDOWS NT and OS/2 are true operating systems, as GEOWORKS and WINDOWS 3.x must be loaded and run under the venerable MICROSOFT MS-DOS operating system. WINDOWS 95 operating sytem is somewhat of a hybrid, as it also requires portions of MS-DOS for its operation. For the sake of simplicity, though, both WINDOWS 3.X and WINDOWS 95 are referred to hereinafter as operating systems.

As this is written, MICROSOFT WINDOWS version 3.X is far and away the most used operating system, having been bundled with nearly every personal computer sold between 1989 and mid-1995. However, from the date of its release in 1995, the MICROSOFT WINDOWS 95 operating system from Microsoft Corporation has been bundled with most new, high-performance personal computers. In less than a year, it has become the operating system of choice for most business applications, and is expected to rapidly supplant WINDOWS 3.X as the most used operating system for personal computers. The potential exists for significantly increasing the performance of both CD-ROM drives and distributed processing networks operating under WINDOWS 3.X and WINDOWS 95 operating systems through caching.

SUMMARY OF THE INVENTION

Shortly after the release of WINDOWS 95, Sun Microsystems, Inc. (hereinafter "Sun") set about to create a network and CD-ROM caching product that runs under both WINDOWS 3.X and WINDOWS 95, is completely transparent to end-users, and works with a wide variety of file systems running under both WINDOWS 3.X and WINDOWS 95. In order to fulfill these requirements in its recently released caching product, Sun utilizes the services provided by the Installable File System Manager (IFSMGR) virtual device driver. This process is fully explained in related patent application Ser. No. 08/641,654 (Sun patent docket No. P1503). Briefly, the IFSMGR driver permits the caching product via a "hook" to view all file system input/output (I/O) requests and to take interim control of the I/O operation while performing the caching functions. Thus, the new caching product is effectively "layered" between the IFSMGR driver and the generic file system of WINDOWS 95. The caching product also fits the definition of a virtual device driver.

Sun's new caching product, which has been named "SOLSTICE PC-CACHEFS" (hereinafter "PC-CACHEFS"), employs a block of readable, writable and erasable memory resident on rotating, magnetic-media (e.g., a hard-disk drive). As a performance enhancement, it may also employ a block of readable, writable and erasable memory in the random access memory (RAM).

Rather than create separate caching products for WINDOWS 3.X and WINDOWS 95, the PC-CACHEFS caching product has been designed so that it will run under both operating systems. However, the WINDOWS 3.X operating system has no IFSMGR virtual device driver. Thus, portions of the WINDOWS 95 IFSMGR VxD have been rewritten to run under WINDOWS 3.X. The rewrite is based on the IFSMGR specification provided by Microsoft Corporation. Thus, neither the PC-CACHEFS caching product (VxD) nor the WINDOWS operating systems, themselves, need be rewritten for the sake of compatibility.

This invention includes a multi-tier cache system and a method for implementing such a multi-tier cache system. The multi-tier caching system is implemented in conjunction with a computer system having a random access memory (RAM), and at least one local non-volatile local mass storage device on which data can be alterably stored. In a preferred embodiment of the invention, the caching system includes a mass storage device having a slower access time than that of the local mass storage device, this slower mass storage device having been designated for caching. This slower mass storage device can be a CD-ROM drive controlled by the computer system, a CD-ROM drive controlled by a server data processing system to which the computer system is coupled via a network data link, or a mass storage device such as a hard disk drive that is controlled by a server data processing system, and to which the computer system is coupled via a network data link. The slower mass storage device provides storage for third-tier data.

The preferred embodiment of the caching system also includes a non-volatile cache established on a portion of the local mass storage device. The non-volatile cache, which has a storage capacity less than that of the slower mass storage device, provides storage for blocks of second-tier data, which is a sub-set of the third-tier data. The data blocks within the non-volatile cache are managed for garbage collection in a random manner.

The preferred embodiment of the caching system also includes a RAM cache established in a portion of the system RAM. The RAM cache, which has a storage capacity less than that of the non-volatile cache, provides storage for sub-blocks of first-tier data, which is a subset of the second-tier data.

For the preferred embodiment of the invention, an unused block within the non-volatile cache is randomly selected to be purged of data during non-volatile cache updates when an empty block is unavailable. Likewise for the preferred embodiment of the invention, a least recently used sub-block within the RAM cache is purged of data during RAM cache updates when no sub-block is empty. The caching system operates in response to incoming file I/O requests. If an incoming file I/O request involves data resident on the slower mass storage device, within the non-volatile cache, but not within the RAM cache, the RAM cache is updated from the non-volatile cache. When an incoming file I/O request involves data resident on the slower mass storage device, but not resident within the non-volatile cache or within the RAM cache, both the RAM cache and the non-volatile cache are updated from the slower mass storage device.

In a preferred embodiment of the invention, the data blocks within the non-volatile memory are the same size as the data sub-blocks within the RAM cache.

Also for the preferred embodiment of the invention, a portion of the system RAM is utilized for maintaining a data table which implements garbage collection (i.e., a purge) involving the least recently used sub-block within the RAM cache during RAM cache updates when no sub-block is empty. Also for the preferred embodiment of the invention, both the RAM cache and the data table are established in RAM upon the receipt of a file I/O request at system boot-time initialization.

When a file I/O request is received through a "hook" to the IFSMGR VxD, a hashing mechanism is employed to search for the "bucket" within the RAM cache in which the requested data will be located if the requested data has been loaded in the RAM cache.

DETAILED DESCRIPTION OF PREFERRED EMBODIMENTS

The embodiments of the invention described herein may be implemented as logical operations in a distributed processing system having client and server computing systems. The logical operations of the present invention are implemented (1) as a sequence of computer implemented steps running on the computing system and (2) as interconnected machine modules within the computing system. The implementation is a matter of choice that is dependent on the performance requirements of the computing system implementing the invention. Accordingly, the logical operations making up the embodiments of the invention described herein are referred to variously as operations, steps or modules.

Figure 1:
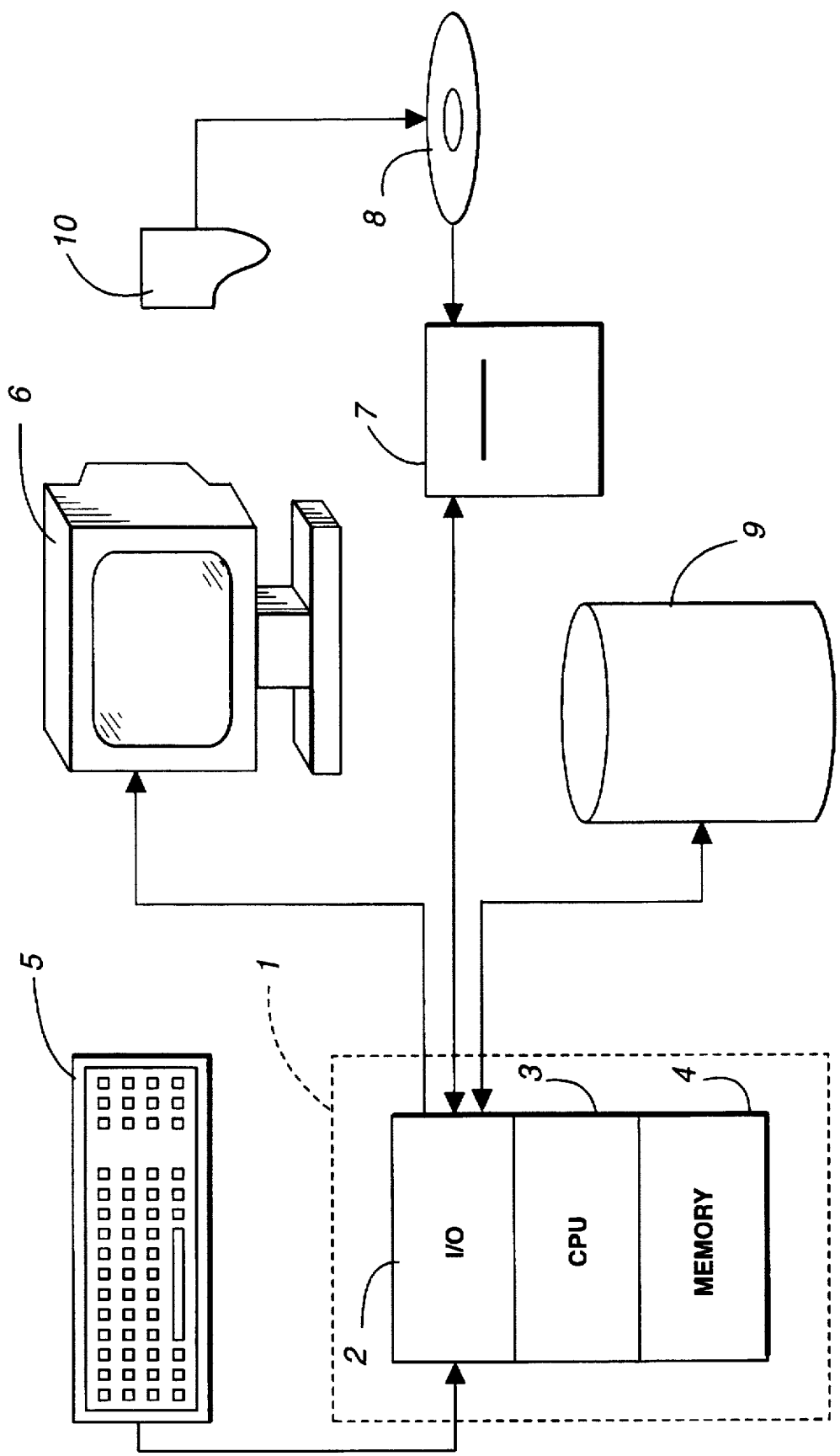
FIG. 1 illustrates a computing system for performing the computer implemented steps of the method in accordance with the invention.

The operating environment in which the present invention is used encompasses the general distributed computing system, wherein general purpose computers, workstations, or personal computers (hereinafter local nodes) are connected via communication links of various types, in a client-server arrangement, wherein programs and data, many in the form of objects, are made available by various members of the system. Some of the elements of a general purpose workstation computer are shown in FIG. 1, wherein a processor 1 is shown, the processor having an input/output (I/O) section, a central processing unit (CPU) 3 and a memory section 4. The I/O section 2 is connected to a keyboard 5, a display unit 6, a disk storage unit 9 and a CD-ROM drive unit 7. The CD-ROM unit 7 can read a CD-ROM medium 8 which typically contains programs 10 and data. The computer program products containing mechanisms to effectuate the apparatus and methods of the present invention may reside in the memory section 4, or on a disk storage unit 9, or on the CD-ROM 8 of such a system. Examples of such systems include SPARC computer architecture systems offered by Sun MicroSystems, Inc., personal computers offered by IBM Corporation and by other manufacturers of IBM-compatible personal computers, and systems running the UNIX operating system.

The present invention has been incorporated in Sun's PC-CACHEFS network and CD-ROM caching product. PC-CACHEFS runs under both WINDOWS 3.X and WINDOWS 95, is completely transparent to end-users, and works with a wide variety of file systems running under both WINDOWS 3.X and WINDOWS 95. The PC-CACHEFS caching product interfaces with a software module within the MICROSOFT WINDOWS 95 operating system known as the Installable File System Manager (IFSMGR) The IFSMGR module is classified as a virtual device driver (V×D for short) by Microsoft Corporation. The PC-CACHEFS product also fits the definition of a virtual device driver. The WINDOWS 95 operating system is designed so that all file system input/output (I/O) requests are "hooked" to the IFSMGR V×D. In a preferred embodiment of the invention, the PC-CACHEFS V×D is layered between the IFSMGR V×D and the generic file system of WINDOWS 95. In a preferred embodiment of the invention, the PC-CACHEFS V×D receives all file system I/O requests from the IFSMGR V×D and implements a caching scheme in accordance with set-up instructions which have been pre-programmed by the user of a local node. In other words, the user tells the PC-CACHEFS V×D which network or CD-ROM drive(s) are to be cached.

Although the MICROSOFT WINDOWS 95 operating system does provide caching for local disk drive accesses in system random access memory (RAM), it generally fails to cache network and CD-ROM accesses. The caching functions provided by the WINDOWS 3.x, on the other hand, are considerably less developed than those of WINDOWS 95.

In order to enhance the performance of the MICROSOFT WINDOWS 3.x and 95 operating systems, the preferred embodiment of the present invention provides for multi-tier caching of information stored on local CD-ROM drives and on non-local network resources, which may include both local and distant server system disk drives and the like. A small upper-tier cache is initialized in high-speed random access memory (RAM) that is managed in a Least Recent Used (LRU) fashion. The RAM may assembled from static random access memory (SRAM) chips, dynamic random access memory (DRAM) chips, ferroelectric DRAM memory chips, or various other types of high-speed RAM. The small cache in RAM is backed by a much larger non-volatile, lower-tier cache on a local hard disk drive. The use of a multi-tier cache memory system is advantageous for several reasons. The disk-drive-resident cache provides for non-volatile storage of data retrieved from a non-local network drive or local or non-local CD-ROM drive. Thus when the data processing system on which the multi-tier cache system is powered down, cached data on the hard disk drive will not be lost. The high-speed RAM cache provides much faster access to data than does a hard disk drive, and even though data stored in RAM cache will generally be lost when the system is powered down, it may be partly or fully reloaded from the non-volatile on-disk cache when the RAM cache is reinitialized following system boot-up. This invention includes not only the multi-tier cache system apparatus, but also the method for implementing such a multi-tier cache system apparatus.

Figure 2A:
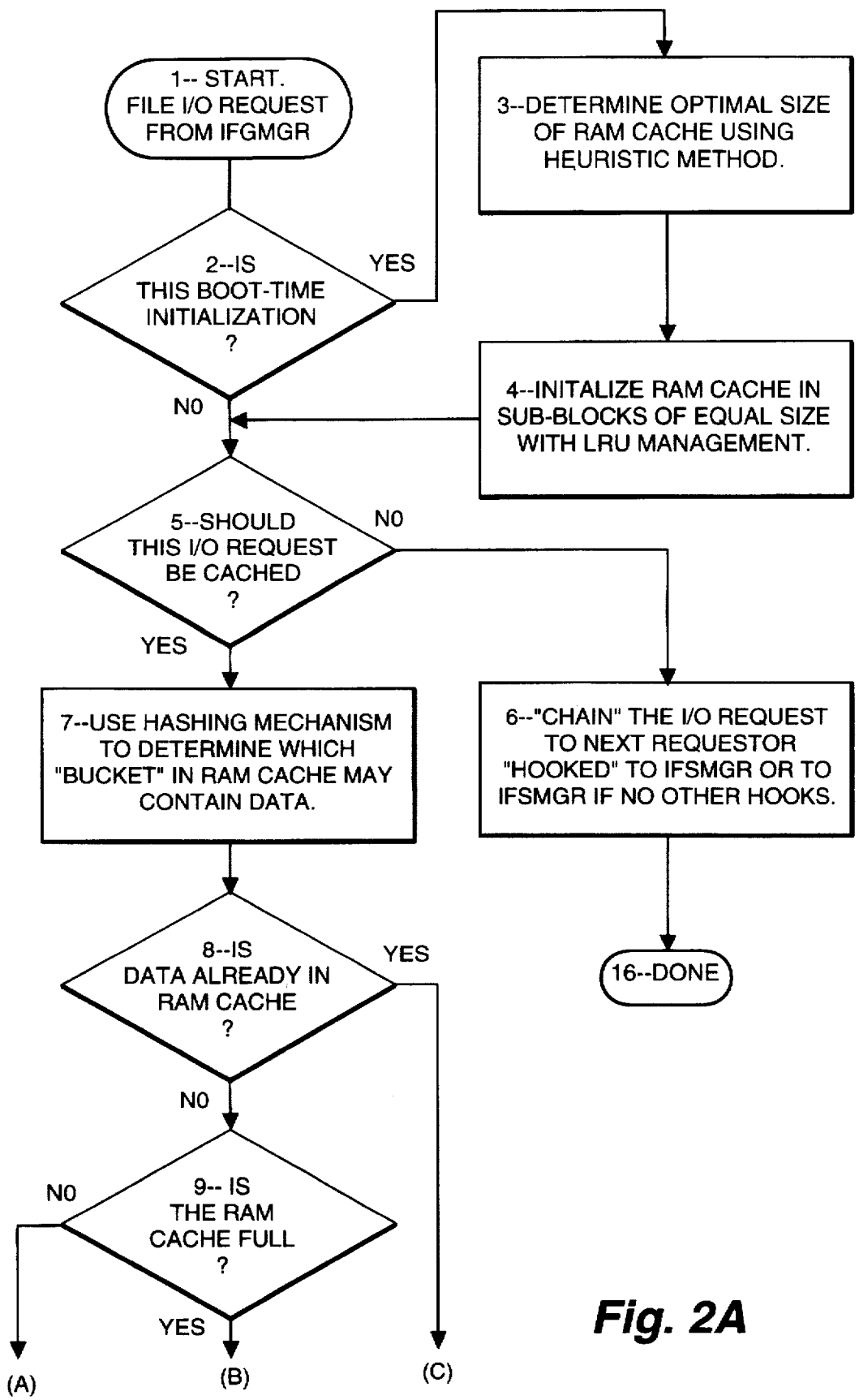
FIG. 2 is a flow chart depicting the logical operational flow of the RAM cache.
Figure 2B:
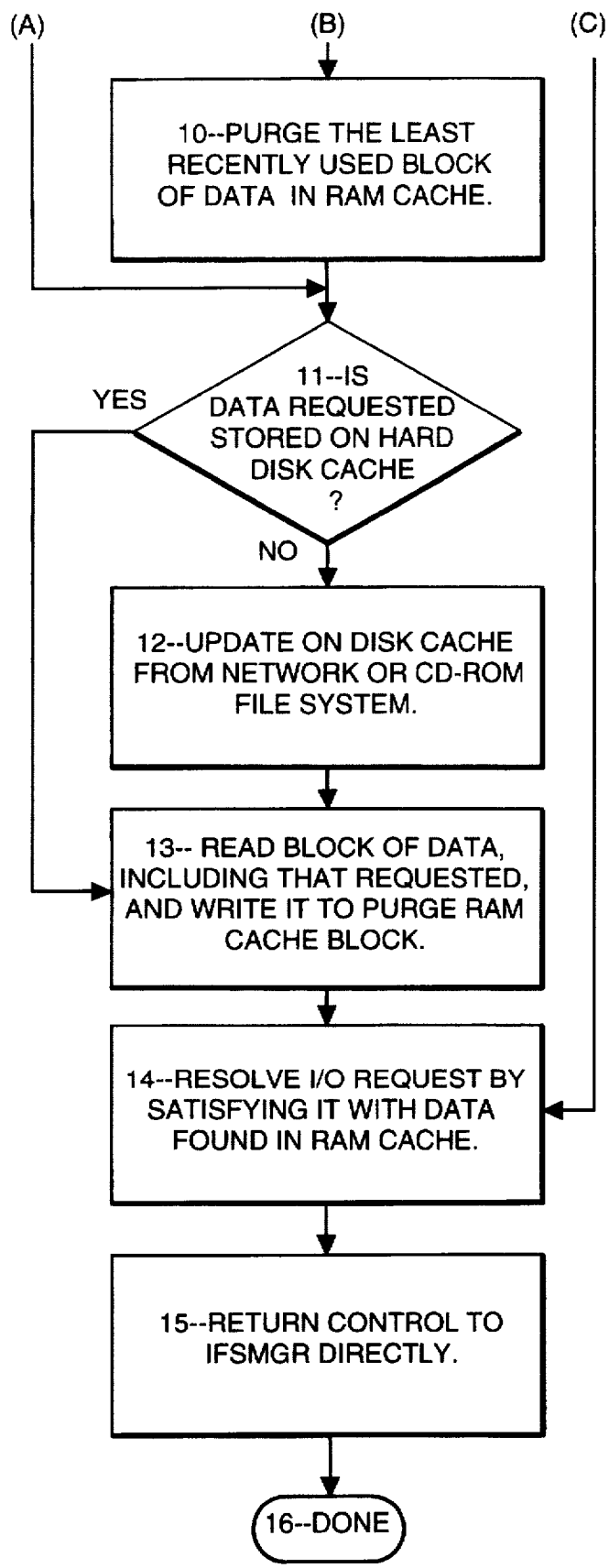

The pseudo-code flow chart of FIG. 2 details the logical steps utilized for implementing and maintaining a preferred embodiment of the multi-tier cache system. Although an overview of the operation of the on-disk cache is covered in this disclosure, additional details are provided in three related patent applications: Ser. No. 08/641,654 filed on May 01, 1996 titled "METHOD FOR IMPLEMENTING A NON-VOLATILE CACHING PRODUCT FOR NETWORKS AND CD-ROMS"; Ser. No. 08/640,527 filed on May 01, 1996, titled "METHOD FOR CACHING NETWORK AND CD-ROM FILE ACCESS USING A LOCAL HARD DISK DRIVE"; and Ser. No. 08/641,523 filed on May 01, 1996 titled "METHOD FOR PURGING UNUSED DATA FROM A CACHE MEMORY".

Referring now to Step 1 of FIG. 2, the method begins upon receipt by the caching V×D of a file I/O request from the IFSMGR V×D either directly or via a chain a hooked chain therefrom. In Step 2, a determination is made as to whether or not this is an instance of boot-time initialization. If it is, then Step 3 determines the optimum size for a RAM cache within the system memory using a heuristic (i.e., educated guess) technique. Step 4 initializes the RAM cache by establishing sub-blocks therein of equal size and also setting up a mini data-base with which to manage the sub-blocks in a Least Recent Used (LRU) fashion. For a preferred embodiment of the invention, each sub-block within the RAM cache is 8 kilobytes. In Step 5, a determination is made as to whether or not the incoming I/O request pertains to a memory resource which has been configured for caching. If is not, the request is chained to the next hook or back to the IFSMGR if there are no subsequent hooks in the chain. In Step 7, a hashing mechanism is employed to determine which "bucket" within the RAM cache may contain the requested data. In Step 8, a determination is made as to whether or not the requested data is already in the RAM cache. If the required data it is already in the RAM cache, the file I/O request is satisfied with such data in Step 15, and control is returned to the IFSMGR in Step 16. If, on the other hand, the required data is not already in the RAM cache, it must be loaded therein. Step 10 purges (i.e., deletes)

the least recently used block of data in the RAM cache. Step 11 checks to see if the requested data is resident within the on-disk cache. If the requested data is not resident within the on-disk cache, the on-disk cache is updated from the network or CD-ROM file system in Step 12. Once the requested data is resident within the on-disk cache, an amount of data the size of a sub-block within the RAM cache, which includes the requested data, is read from the on-disk cache and written to the purged sub-block within the RAM cache in Step 13. The I/O request is satisfied, at Step 14, with the data now in the RAM cache. In Step 15, control of the file I/O request is returned directly to the IFSMGR VxD directly. Step 16 indicates that the RAM cache implementation method is complete.

Purging of data within the non-volatile cache located on the hard drive is required whenever the non-volatile cache must be updated when full. A unique purging method is employed that requires absolutely no system overhead when the system is running and the cache is not completely full. No system overhead is required because the new purging method does not utilize a purging algorithm which requires the caching program to maintain tables for keeping track of blocks of data within the non-volatile cache on the basis of recentness or frequency of use. When all blocks within the non-volatile cache have been filled, a block of data is removed in a pseudo-random manner, one at a time, until ample space is available within the cache. This purging method, which trades a small loss in percentage of cache hits for an increase in cache operating speed, is particularly applicable to cache memories established on rotating magnetic media such as hard disk drives. This purging method is disclosed in related application Ser. No. 08/641,523 filed May 1, 1996, and titled "METHOD FOR PURGING UNUSED DATA FROM A CACHE MEMORY".

Thus, the multi-tier cache system provides hierarchical storage for three levels of data. The lower tier is represented by data on a slow-speed mass-storage device, such as a local CD-ROM drive or a networked mass-storage device having an access speed slowed by connection to a local node via a data link. The second tier is represented by cached data within a non-volatile memory such as a hard disk drive. The first tier is represented by cached data within a portion of system RAM.

While the invention has been particularly shown and described with reference to a preferred embodiment thereof, it will be understood by those skilled in the art that various other changes in the form and details may be made therein without departing from the spirit and scope of the invention.

What is claimed is:

1. A method for implementing a multi-tier caching system, said multi-tier caching system being implemented on a computer system having a random access memory (RAM), a portion of which is set aside and initialized as a RAM cache for storing first-tier data within a plurality of RAM data blocks, and at least one local non-volatile local mass storage device on which data can be alterably stored and on which a portion thereof functions as a non-volatile cache for storing second-tier data within non-volatile data blocks, said computer system having a data path to a mass storage device with an access speed slower than that of the local mass storage device, said slower mass storage device storing a full set of file data, said method comprising the steps of:

whenever a received file input/output request involves data resident on said slower mass storage device and the requested data is not available as first-tier data nor available as second-tier data, determining whether or not all RAM data blocks are already filled with first-tier data;

purging first-tier data from a least-recently-used RAM data block if all RAM data blocks are already filled;

retrieving a quantity of third-tier data which includes the requested data;

writing all retrieved third-tier data to a non-volatile data block, as well as to an empty RAM data block; and resolving the file input/output request from the retrieved third-tier data written to the empty RAM data block.

2. The method of claim 1, which further comprises the step of determining, upon receipt of a file input/output request, whether or not the request involves third-tier data resident on the slower mass storage device.

3. The method of claim 1, wherein said method further comprises the step of determining, for a file input/output request involving data resident on said slower mass storage device, whether or not first tier data which satisfies the request is already resident in one of said RAM data blocks.

4. The method of claim 3, which further comprises the step of resolving the request from such first-tier data if such first-tier data which satisfies the request is already resident in one of said RAM data blocks.

5. The method of claim 1, which, if a received input/output request involves data resident on said slower mass storage device, and if the requested data is not available as first-tier data, but is available as second-tier data, further comprises the steps of:

determining whether or not all RAM data blocks are already filled with first-tier data;

purging a least-recently-used RAM data block if all RAM data blocks are already filled;

retrieving a quantity of second-tier data which includes the requested data;

writing retrieved second-tier data to an empty RAM data block; and resolving the file input/output request from the retrieved second-tier data written to the empty RAM data block.

6. The method of claim 1, wherein said portion of the RAM is set aside and initialized as a RAM cache at operating system boot-time.

7. The method of claim 1, wherein said RAM data blocks and said non-volatile data blocks are of equal size.

8. The method of claim 1, wherein said slower mass storage device is a CD-ROM drive controlled by said computer system.

9. The method of claim 1, wherein said slower mass-storage device is a CD-ROM drive controlled by a server data processing system to which the computer system is coupled via a network data link.

10. The method of claim 1, wherein said slower mass-storage device is a hard disk drive controlled by a server data processing system to which the computer system is coupled via a network data link.

11. A method for implementing a multi-tier caching system, said multi-tier caching system being implemented on a computer system having a random access memory (RAM), a portion of which is set aside and initialized as a RAM cache for storing first-tier data within a plurality of RAM data blocks, and at least one local non-volatile local mass storage device on which data can be alterably stored and on which a portion thereof functions as a non-volatile cache for storing second-tier data within non-volatile data blocks, said computer system having a data path to a mass storage device with an access speed slower than that of the local mass storage device, said slower mass storage device storing a full set of file data, said method comprising the steps of:

whenever a received file input/output request involves data resident on said slower mass storage device, and the requested data is not available as first-tier data nor available as second-tier data, providing for determining whether or not all RAM data blocks are already filled with first-tier data;

providing for purging first-tier data from a least-recently-used RAM data block if all RAM data blocks are already filled;

providing for retrieving a quantity of third-tier data which includes the requested data;

providing for writing all retrieved third-tier data to a non-volatile data block, as well as to an empty RAM data block; and providing for resolving the file input/output request from the retrieved third-tier data written to the empty RAM data block.

12. The method of claim 11, which further comprises the step of providing for determining, upon receipt of a file input/output request, whether or not the request involves third-tier data resident on the slower mass storage device.

13. The method of claim 11, wherein said method further comprises the step of providing for determining, for a file input/output request involving data resident on said slower mass storage device, whether or not first tier data which satisfies the request is already resident in one of said RAM data blocks.

14. The method of claim 13, which further comprises the step of providing for resolving the request from such first-tier data if such first-tier data which satisfies the request is already resident in one of said RAM data blocks.

15. The method of claim 11, which, if a received input/output request involves data resident on said slower mass storage device, and if the requested data is not available as first-tier data, but is available as second-tier data, further comprises the steps of:

providing for determining whether or not all RAM data blocks are already filled with first-tier data;

providing for purging a least-recently-used RAM data block if all RAM data blocks are already filled;

providing for retrieving a quantity of second-tier data which includes the requested data;

providing for writing all retrieved second-tier data to an empty RAM data block; and providing for resolving the file input/output request from the retrieved second-tier data written to the empty RAM data block.

16. A computer program product comprising a computer usable medium having computer readable code embodied therein for implementing a multi-tier caching system on a computer system, said computer system having a random access memory (RAM), a portion of said RAM being is set aside and initialized as a RAM cache for storing first-tier data within a plurality of equal sized RAM data blocks, and at least one local non-volatile local mass storage device on which data can be alterably stored, a portion of said local mass storage device functioning as a non-volatile cache for storing second-tier data in non-volatile data blocks, said computer program product further comprising:

computer readable program code devices configured to cause a computer, whenever a received input/output request involves data resident on a mass storage device identified for caching, and if the requested data is not available as first-tier data nor available as second-tier data, to effect determining whether or not all RAM data blocks are already filled with first-tier data, to effect purging first-tier data from a least-recently-used RAM data block if all RAM data blocks are already filled, to effect retrieving a quantity of third-tier data which includes the requested data, to effect writing retrieved third-tier data to a non-volatile data block, as well as to an empty RAM data block, and to effect resolving the file input/output request from the retrieved third-tier data written to the empty RAM data block.

17. The computer program product of claim 16, which further comprises computer readable program code devices configured to cause the computer system to effect determining, upon receipt of a file input/output request from the operating system, whether or not the request involves third-tier data resident on a mass storage device, other than the local mass storage device, which is identified for caching of resident file data.

18. The computer program product of claim 16, which further comprises computer readable program code devices configured to cause a computer to effect determining, for a file input/output request from an operating system controlling the computer system's operation, a request involving data resident on a mass storage device identified for caching, whether or not first tier data which satisfies the request is already resident in one of said sub-blocks of the RAM cache, and, if first-tier data which satisfies the request is already resident in one of said sub-blocks, to effect resolving the request from such first-tier data.

19. The computer program product of claim 16, which further comprises computer readable program code devices configured to cause a computer, if a received input/output request involves data resident on a mass storage device identified for caching, and if the requested data is not available as first-tier data, but is available as second-tier data, to effect determining whether or not all sub-blocks are already filled with first-tier data, to effect purging a least-recently-used sub-block if all sub-blocks are already filled, to effect retrieving a quantity of second-tier data which includes the requested data, to effect writing retrieved second-tier data to an empty sub-block, and to effect resolving the file input/output request from the retrieved second-tier data written to the empty sub-block.

20. A multi-tier caching system implemented in conjunction with a computer system having a random access memory (RAM), and at least one local non-volatile local mass storage device on which data can be alterably stored, said multi-tier caching system comprising:

a mass storage device having a slower access time than that of said local mass storage device, said slower mass storage device having been designated for caching, and said slower mass storage device providing storage for third-tier data;

a non-volatile cache established on a portion of said local mass storage device, said non-volatile cache providing storage for non-volatile blocks of second-tier data, said non-volatile cache having a total storage capacity less than that of said slower mass storage device, said second-tier data being a sub-set of said third-tier data always comprising at least the most recently used third-tier data; and a RAM cache established in a portion of the RAM, said RAM cache providing storage for RAM blocks of first-tier data, and said RAM cache having a total storage capacity less than that of said non-volatile cache, said first-tier data being a subset of said second-tier data comprising all of the most recently used third-tier data, said RAM cache coupled to supply all requests for data stored on said mass storage device having a slower access time.

21. The multi-tier caching system of claim 20, wherein an unused non-volatile data block is randomly selected to be purged of data during non-volatile cache updates when an empty non-volatile data block is unavailable.

22. The multi-tier caching system of claim 20, wherein a least recently used RAM data block is purged of data during RAM cache updates when no RAM data block is empty.

23. The multi-tier caching system of claim 20, wherein said slower mass storage device is a CD-ROM drive controlled by said computer system.

24. The multi-tier caching system of claim 20, wherein said slower mass storage device is a CD-ROM drive controlled by a server data processing system to which the computer system is coupled via a network data link.

25. The multi-tier caching system of claim 20, wherein said slower mass storage device is a hard disk drive controlled by a server data processing system to which the computer system is coupled via a network data link.

26. The multi-tier caching system of claim 20, wherein if an incoming file I/O request involves data resident on both said slower mass storage device and within said non-volatile cache but not within said RAM cache, said RAM cache is updated from the non-volatile cache.

27. The multi-tier caching system of claim 20, wherein if an incoming file I/O request involves data resident on said slower mass storage device, but not resident within said non-volatile cache or within said RAM cache, said RAM cache and said non-volatile volatile cache are both updated from said slower mass storage device.

28. The multi-tier caching system of claim 20, wherein the non-volatile data blocks within said non-volatile memory are the same size as the RAM data blocks within said RAM cache.

29. The multi-tier caching system of claim 20, wherein a portion of said RAM is utilized for maintaining a table which implements garbage collection involving the least recently used sub-block within the RAM cache during RAM cache updates when no RAM data block is empty.

30. The multi-tier caching system of claim 29, wherein said RAM cache and said table are established in RAM upon the receipt of a file I/O request at system boot-time initialization.

* * * * *